May 9, 1961
F. A. GREENAWALT ET AL
2,983,286
REVERSING VALVE
Filed Jan. 19, 1959
2 Sheets-Sheet 1
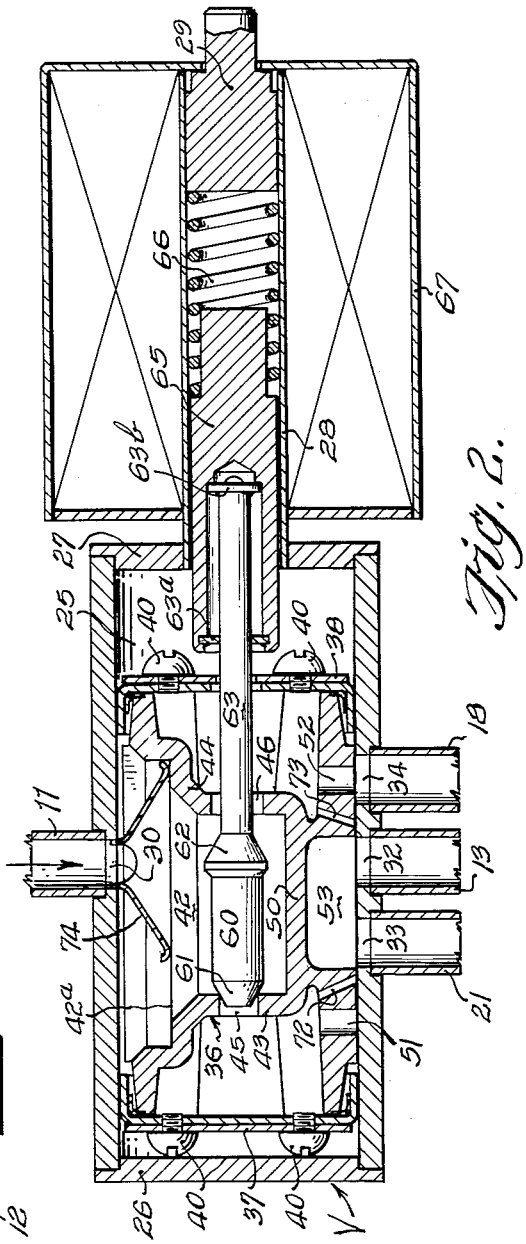
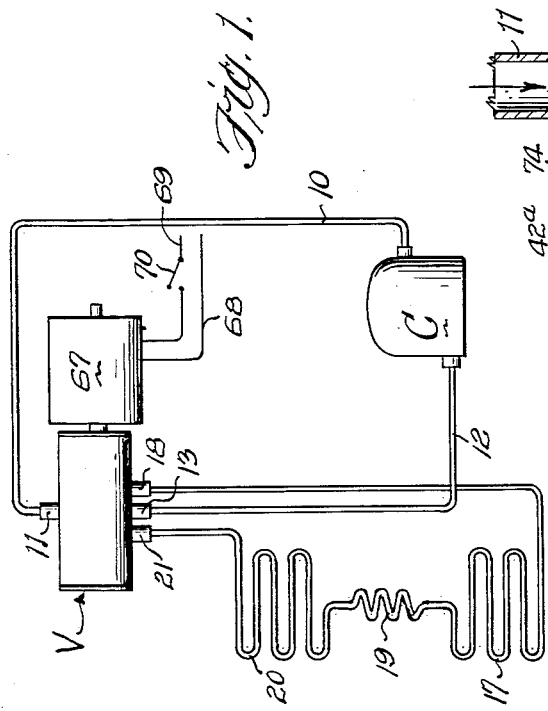
INVENTORS:
FREDERICK A. GREENAWALT.
BY ESTEL C. RANEY.
ATTORNEY.

May 9, 1961
F. A. GREENAWALT ET AL
2,983,286
REVERSING VALVE
Filed Jan. 19, 1959
2 Sheets-Sheet 2
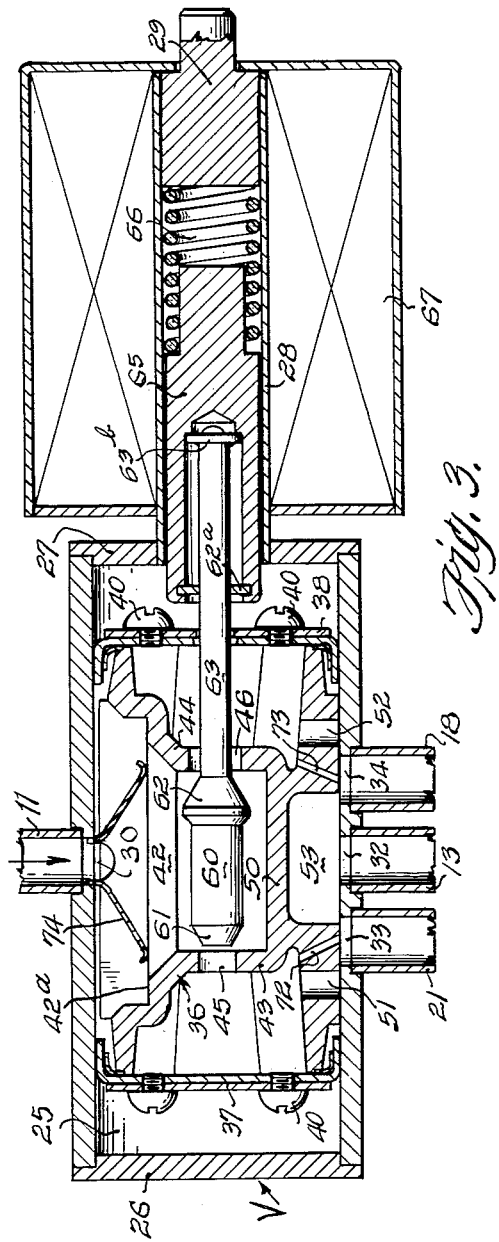
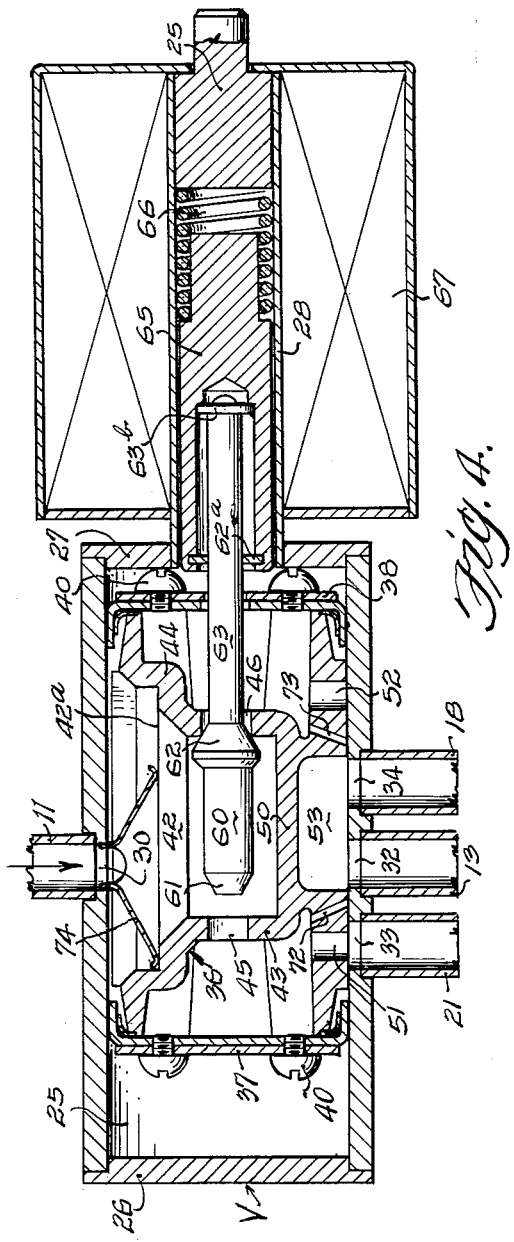
INVENTOR.
FREDERICK A. GREENAWALT.
BY ESTEL C. RANEY.
ATTORNEY.

United States Patent Office 2,983,286
Patented May 9, 1961

2,983,286

REVERSING VALVE

Frederick A. Greenawalt and Estel C. Raney, Fort Lauderdale, Fla., assignors to Ranco Incorporated, Columbus, Ohio, a corporation of Ohio Filed Jan. 19, 1959, Ser. No. 787,402

2 Claims. (Cl. 137—625.43)

The present invention relates to an improved fluid reversing valve particularly suitable for reversing the flow of refrigerant in a refrigerating system, and utilizing the pressure of the fluid passing through the valve mechanism to shift movable members thereof to cause a reversal of direction of flow of the fluid.

An object of the present invention is to provide an improved reversing valve particularly suitable for reversing the order of flow of refrigerant through heat exchangers of a compressor-condenser-expander type refrigerating system, which exchanges may function either as a condenser or as an evaporator, the valve comprising a chamber for receiving the discharge of the compressor through a side port thereof and having a return port in another side and flanked by two reverse flow ports, a reciprocable slide valve structure for alternately opening one reverse flow port to the fluid in the chamber and connecting the other reverse flow port with the return flow port, which is connected to the intake of the compressor, and vice versa, the slide structure being actuated by a piston reciprocated in the chamber by the pressure of the fluid passing from the inlet port to either of the open reverse flow ports, the piston having two spaced opposed walls exposed at all times to the pressure of the fluid entering the inlet port and each having a full flow port therethrough forming fluid passages to the respective alternate reverse flow ports, the flow ports being alternatively opened and closed by shiftable valve members whereby when one flow port is closed the other flow port is opened. By this arrangement the pressure on the piston wall having the closed flow port forces the piston in a direction to shift the slide valve structure to close the open reverse flow port and to open the other reverse flow port to the fluid entering the chamber through the open flow port whereby the fluid pressure on opposite sides of the valve closure members for the flow ports in the piston walls are equalized after the piston has shifted the slide valve structure so that a relatively low powered operating device may be used to shift the valve closure members.

Another object of the invention is to provide bleed-passages from the areas defined by the ends of the piston and the respective confronting ends of the chamber which passages are open to the return port during the time the piston is shifted to connect the area into which the piston is moving with the outlet port so that a substantial pressure differential on opposite sides of this piston is assured throughout the valve shifting movement of the piston. These bleed passages are preferably provided by forming two passages of relatively small diameter through the slide valve structure, each passage having one end opening on the outer side of the respective opposed piston walls and the other end in a position to be closed by the chamber wall when the slide structure is at either of its alternate positions and which is open to the reverse flow ports and the outlet port during the valve shifting movement of the piston.

Other objects and advantages of the invention will be apparent from the following description of a preferred form of the invention, reference being made to the accompanying drawings wherein—

Fig. 1 is a schematic view of a refrigerating system employing an improved valve embodying the invention, and Figs. 2, 3 and 4 are sectional views of the improved valve mechanism showing various parts thereof in different positions, Fig. 3 being shown partly broken away.

Referring to Fig. 1 of the drawings, the improved valve is shown at V connected in a conventional compressor-condenser-expander type refrigerating circuit comprising a hermetically sealed electric driven compressor C having its outlet or discharge side connected by a tube 10 to an inlet sleeve 11 of valve V and its intake or suction side connected by a tube 12 to an outlet sleeve 13 of the valve. A refrigerant heat exchanger 17 has one end connected to a reverse flow passage sleeve 18 of valve V and the opposite end connected to one end of a capillary restrictor tube 19. The opposite end of restrictor 19 is connected to the inlet of a refrigerant heat exchanger 20, and the outlet of exchanger 20 is connected to a second reverse flow passage sleeve 21 of the valve. The exchanger 17 may be the condenser of a conventional refrigeration system or it may be the outdoor exchanger of an air-to-air heat pump, and exchanger 20 may be the evaporator of a conventional refrigeration system or it may be the indoor exchanger of a heat pump system in which air for a room, for example, is arranged to be either heated or cooled by this exchanger. When compressor C is operated, refrigerant under relatively high pressure flows through tube 10 into valve V, and when the valve mechanism is in one flow position, the refrigerant flows from the valve through sleeve 18 to exchanger 17 which now acts as a condenser for condensing the refrigerant. The liquified refrigerant is then conducted through restrictor 19 into exchanger 20 where it is vaporized, thereby giving up heat and causing cooling of the exchanger walls, as is well understood in the art. The vaporized refrigerant is conducted into valve V through sleeve 21 and directed into suction tube 12 of the compressor C through outlet sleeve 13. The valve mechanism of valve V may be operated to reverse the order of flow of refrigerant through the exchangers so that the high pressure refrigerant entering the valve at 11 passes through the reverse passage sleeve 21 and into exchanger 20 to cause the latter to function as a condenser and the refrigerant condensed therein is fed through capillary 19 into exchanger 17, which now functions as an evaporator and in which the liquid refrigerant is vaporized and then drawn into the low side of the compressor C through valve V. As is well known in the art, the reversal of flow of refrigerant is useful to either provide quick defrosting of the exchanger 20 if it is normally used as an evaporator in a refrigerating system, or if this exchanger serves to affect the temperature of air in a space, the reversal of flow may provide for selectively heating or cooling of the space, according to the direction of flow of the fluid through the exchangers, all of which is well known in the art.

The details of valve V are shown in Figs. 2, 3 and 4 and it will be seen that it comprises a cylindrical chamber 25, one end of which is closed by an end plate 26 and the opposite end is closed by a cap 27. End plate 26 and cap 27 are preferably brazed in the ends of the cylinder to form gas-tight seals, and cap 27 has a sleeve 28 attached thereto by a gas-tight brazed joint, the outer end of the sleeve being closed by a plug 29 similarly attached therein. Chamber 25 has an inlet opening 30 in one side thereof at the central portion into which inlet sleeve 11 is brazed, and the opposite central portion of the chamber has openings 32, 33 and 34 in which sleeves 13, 18 and 21 are brazed, respectively.

A piston 36 is arranged to reciprocate through a given stroke within chamber 25, and it is preferably formed of a suitable molded plastic member having two-ply end plates 37 and 38 attached thereto by bolts 40 threaded into the piston body. Plates 37 and 38 have a more or less loose fit with the interior walls of the chamber so that gas may flow readily about the edges of the plates and the plates guide the piston in the chamber. The side of piston 36 adjacent to inlet 30 has an elongated recess 42 therein and is of such length that it is aligned with the inlet opening throughout the stroke of the piston. Recess 42 has a semi-cylindrical inner portion, and the ends of the recess, including the inner portion, have end walls 43, 44 which present pressure surfaces normal to the direction of movement of the piston.

Walls 43 and 44 have fluid openings in the form of valve seats 45 and 46 therethrough, respectively, and the bottom wall 50 of the piston has two vertical fluid passages 51 and 52 formed therethrough. Seats 45 and 46 and openings 51 and 52 are of such cross-sectional area that they may carry the full capacity flow of the valve. Openings 51 and 52 are arranged so that when piston 36 is at its left hand position, as shown in Fig. 2, opening 51 is closed by the chamber wall and opening 52 is aligned with reverse flow opening 34, and when the piston is in its opposite position, as seen in Fig. 4, opening 51 is aligned with reverse flow opening 33 and opening 52 is closed by the chamber wall. Piston wall 50 also has a recess 53 which is of such length that when the piston 36 is at one end of its stroke, as illustrated in Fig. 2, the recess forms a full capacity fluid passage between reverse passage inlet 33 and outlet passage 32, and when the piston is at the opposite end of its stroke, as shown in Fig. 4, the recess forms a fluid passage between reverse opening 34 and outlet 32. It is to be understood that the bottom wall 50 extends beyond the edges of openings 32, 33 and 34 and forms a gas-tight seal with the wall of the chamber 25.

Valve seats 45 and 46 are alternately opened and closed by a valve member 60 having a tapered end 61 arranged to close on seat 45 and a tapered annular portion 62 arranged to close on seat 46; however, the spacing of valve portions 61 and 62 is such that when one portion closes its seat the other portion is removed from its seat. Member 60 is integral with a stem 63 which projects through seat 46 and into a recess in an armature 65 to which the stem is secured by washers 63a and 63b brazed to the stem and armature. The cross-sectional areas of stem 63 and seat 46 are such that the difference therebetween is equal to that of inlet 30 so that full capacity flow may be had through this seat. Armature 65 is arranged to reciprocate in sleeve 28 and is biased to a position to close valve portion 61 on seat 45 by a compression spring 66 interposed between plug 29 and the armature. A solenoid 67 surrounds sleeve 28 and is adapted to be energized by a circuit including wires 68, 69 and an electric switch 70, which may be manually or otherwise operated to control the reverse flow operation of the valve, and when energized, the solenoid by closure of switch 70, valve member 60 is moved to open seat 45 and close seat 46, as illustrated in Fig. 4.

Bleed openings 72 and 73 are formed through valve wall 50 to bleed gas from the areas between the piston walls 43 and 44 and the respective ends of the chamber into outlet opening 32, and flow passages 33 and 34, respectively, as the piston travels to the opposite ends of its stroke, as is illustrated in Figs. 2 and 4.

Preferably, recess 42 has two parallel ledges 42a along opposite sides, only one of which appears in the drawings, and a spring clip type shoe 74 bears on the ledges and engages the edges of inlet opening 30 to maintain the piston and valve structure recess 53 aligned with the fluid openings in the chamber.

The operation of the valve is as follows: Referring to Fig. 2, assuming the solenoid 67 is de-energized and compressor C operating, high pressure refrigerant enters valve inlet opening 30 and flows through seat 46 in piston wall 44, thence through opening 52, into passage 34 and through sleeve 18 to exchanger 17 where the refrigerant is condensed. The liquified refrigerant is then fed through capillary 19 into the exchanger 20 where it is evaporated and drawn through opening 33 in the valve and transferred through valve recess 53 to outlet opening 32, and returned to the compressor through tube 12. It will be noted that high pressure refrigerant exists on both sides of piston walls 43 and 44 and that the lower openings of fluid passage 51 and bleed passage 72 are closed by the walls of chamber 25. The leakage of refrigerant about the end plates 37 and 38 causes equalization of pressures on opposite sides of these plates. Since the lower openings of passages 51 and 72 are tightly closed by the wall of chamber 25 it is immaterial whether or not valve member 61 tightly engages seat 45.

It should be noted that the lower end of bleed passage 73 is blocked by the portion of the wall of chamber 25 between outlet opening 32 and reverse flow opening 34.

Should it be desirable to reverse the flow of refrigerant through the exchangers 17 and 20, solenoid 67 is energized by closing switch 70 and the solenoid draws valve member 60 to the right, as viewed in the drawings, which opens seat 45 and closes seat 46, as is shown in Figs. 3 and 4. Upon this occurrence, pressure rapidly builds up on the left hand side of wall 44; however, due to high rate of leakage around piston end plate 37, and the now open seat 45, the high pressure refrigerant is balanced out on both sides of end plate 37 and wall 43. The area to the right hand side of wall 44 is connected with exchanger 17 through passage 52 and reverse flow opening 34, and although the condenser pressure may be relatively high, the refrigerant pressure on the left hand side of the piston wall 44 quickly exceeds that in the condenser and consequently piston 36 is driven toward the right hand end of chamber 25. During this movement of piston 36 the lower end of passage 52 is carried to one side of reverse flow opening 34 and is closed by the wall of the chamber. However, prior to the described closure of passage 52, the lower end of bleed passage 73 and the right hand end of recess 53 are carried over opening 34 as may be seen in Fig. 3. Bleed passage 73 is then in communication with the low pressure side of the refrigerating system through opening 34, recess 53 and outlet opening 32 so that the refrigerant gas in the right hand end of chamber 25 bleeds off to the low side which reduces the pressure on the right hand side of piston wall 44 and causes the piston to move to the right with such inertia that the ends of screws 40 strike the end plate 27 to stop the piston. It will be seen in Fig. 4 that in the right hand position of the piston, the lower end of bleed opening 73 is moved to the right of opening 34 and is blocked by the wall of the chamber. Refrigerant entering the valve chamber now flows through seat 45, opening 51 into reverse flow opening 33 and to heat exchangers 20 and 17 consecutively and returned through reverse opening 34 to outlet 33 and returned to the compressor, as described previously. The pressures on opposite sides of piston wall 44 and valve portion 62 closing seat 46 are equalized by leakage through the piston and seat so that valve member 60 can be moved without overcoming any appreciable pressure differential.

When it is desired to reverse the flow of refrigerant once more, solenoid 67 is de-energized by opening switch 70, and the valve member 60 is returned to the position shown in Fig. 2 by the force of spring 66, closing seat 45 to block the flow of refrigerant through this seat, thereby causing pressure to build up on the right hand side of wall 43 which drives the piston 36 to the left hand position as shown in Fig. 2. During the movement of the piston to its left hand position, the area on the left hand side of wall 43 is connected with the outlet opening 34, which is the low side of the system, through bleed passage 72 in the same manner as described with reference to bleed opening 73 during movement of the piston in the opposite direction so that the piston will be positively driven to the extreme left end of chamber 25 by a substantial differential in pressures on opposite sides of wall 43. In this position of the piston, the lower end of passages 51 is beyond opening 33 and is closed by the wall of chamber 25 and the lower end of bleed passage 72 is likewise beyond opening 33 and closed by the chamber wall.

It will be seen that due to the fact pressure equalizes on opposite sides of walls 43 and 44 of the piston when the piston is in either extreme position, the power required to operate valve member 60 and thereby cause shifting of the valve structure 50 is no more than would be required to overcome inertia of the parts and friction. It will be seen that the pressure of the fluid in the system is effectively utilized to shift the valve member and that the valve provides efficient control of the direction of flow of fluids. Close dimensional tolerances between the piston and the chamber walls, and the valve member 60 with the seats 45 and 46 are not required thereby minimizing the cost of these parts and expediting the manufacture of the valve mechanism.

Although but one form of the invention has been shown and described, it is to be understood that other forms and modifications and adaptations may be made all falling within the scope of the claims which follow.

We claim:

1. A flow reversing valve comprising a cylinder, a piston reciprocable in said cylinder by pressure differential of fluid in said cylinder at opposite ends of said piston, said cylinder having openings therein in side portions thereof forming a fluid inlet, a fluid outlet and a pair of reverse flow passage openings flanking said outlet, a slide valve reciprocated by said piston and including a surface sliding on the surfaces of said cylinder surrounding said outlet and reverse flow passage openings and having a recess therein the open side of which spans said outlet and one or the other of said reverse flow passage openings to provide alternative fluid flow passages between the respective reverse flow openings and said outlet according to the position of said valve structure in said cylinder, said slide valve structure having fluid flow openings in said sliding surface adjacent opposite ends of the open side of said recess and positioned to register respectively with the reverse flow passage opening not aligned with said recess and leading inwardly relative to said cylinder to provide a flow passage from the interior of said cylinder to the last-mentioned reverse flow passages, said piston including an intermediate chamber having an opening registering with said inlet to said cylinder throughout the reciprocating movement of said piston and comprised of two spaced opposed walls extending transversely of the direction of travel of said piston and cooperating with said slide structure to form fluid barriers between said intermediate chamber and the respective fluid flow openings through said slide structure, said opposed walls each having a fluid flow port therethrough providing fluid passages from said intermediate chamber to the respective fluid flow openings through said slide valve structure, and valve means to alternatively open and close said ports.

2. A flow reversing valve as defined in the preceding claim further characterized by said slide valve structure having fluid passages of restricted flow capacity relative to said fluid flow openings and opening in said slide surface between the opposite ends of the open side of said recess in said valve structure and the fluid flow openings respectively and leading inwardly to the interior of said cylinder.

References Cited in the file of this patent
UNITED STATES PATENTS

| | | |
|---|---|---|
| 2,672,887 | Tipton | Mar. 23, 1954 |
| 2,723,537 | Clark | Nov. 15, 1955 |
| 2,765,628 | Anthony | Oct. 9, 1956 |